US 8,675,660 B2

(12) United States Patent
Abel et al.

(10) Patent No.: US 8,675,660 B2
(45) Date of Patent: *Mar. 18, 2014

(54) SELECTION OF RECEIVE-QUEUE BASED ON PACKET ATTRIBUTES

(75) Inventors: Francois Abel, Rüschlikon (CH); Claude Basso, Raleigh, NC (US); Jean L. Calvignac, Raleigh, NC (US); Natarajan Vaidhyanathan, Carrboro, NC (US); Fabrice Jean Verplanken, LaGaude (FR); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/466,914

(22) Filed: May 8, 2012

(65) Prior Publication Data

US 2012/0218885 A1    Aug. 30, 2012

Related U.S. Application Data

(63) Continuation of application No. 13/302,285, filed on Nov. 22, 2011.

(30) Foreign Application Priority Data

Dec. 16, 2010    (EP) .................................... 10306438

(51) Int. Cl.
*H04L 12/28*    (2006.01)
*H04L 12/54*    (2013.01)
*G06F 15/173*    (2006.01)

(52) U.S. Cl.
USPC ............ 370/392; 370/412; 370/429; 709/238

(58) Field of Classification Search
None
See application file for complete search history.

(56) References Cited

U.S. PATENT DOCUMENTS

| 6,975,638 | B1 | 12/2005 | Chen et al. |
| 7,161,945 | B1 * | 1/2007 | Cummings ................... 370/401 |
| 7,466,703 | B1 * | 12/2008 | Arunachalam et al. ....... 370/392 |
| 8,249,109 | B1 * | 8/2012 | Sgouros et al. ............... 370/474 |
| 2003/0072317 | A1 * | 4/2003 | Yuang et al. .................. 370/412 |
| 2005/0152373 | A1 * | 7/2005 | Ali ............................ 370/395.4 |
| 2008/0107118 | A1 * | 5/2008 | Goetzinger et al. ........ 370/395.4 |
| 2008/0279205 | A1 * | 11/2008 | Sgouros et al. ............... 370/408 |
| 2009/0219937 | A1 | 9/2009 | Liu et al. |
| 2011/0235513 | A1 * | 9/2011 | Ali ................................ 370/232 |

FOREIGN PATENT DOCUMENTS

| JP | 02-093948 A | 4/1990 |
| JP | 02-161931 A | 6/1990 |

* cited by examiner

*Primary Examiner* — Clemence Han
(74) *Attorney, Agent, or Firm* — Brevetto Law Group

(57) ABSTRACT

According to embodiments of the invention, there is provided a method for operating a network processor. The network processor receiving a first data packet in a stream of data packets and a set of receive-queues adapted to store receive data packets. The network processor processing the first data packet by reading a flow identification in the first data packet; determining a quality of service for the first data packet; mapping the flow identification and the quality of service into an index for selecting a first receive-queue for routing the first data packet; and utilizing the index to route the first data packet to the first receive-queue.

26 Claims, 7 Drawing Sheets

SELECTION OF RECEIVE-QUEUE BASED ON PACKET ATTRIBUTES

CROSS-REFERENCE TO RELATED APPLICATIONS

This invention claims priority to the foreign application EP10306438.2 filed Dec. 16, 2010 in the European Patent office.

BACKGROUND

1. Field

The invention relates generally to a method for operating a network processor. In particular. the invention relates to a method for selecting a receive-queue for a packet out of a stream of data packets. The invention relates further to a network processor and a system adapted for a programmable selection of receive-queue based on multiple attributes found in a packet.

2. General Background

Today's computing environments, in particular those of large data centers like cloud computing data centers, require a high level of switching capacities for connecting a large number of server computers with each other. The proliferation of standard servers and the growing usage of virtualization technology increase this need even more.

With the advent of virtualization of network adapters, and the new requirement for deep packet, inspection, a more complete and flexible selection of receive-queues is needed. On one hand, virtualization implies that a receive-queue must be selected in a pool of queues, belonging to a given logical port. On the other hand, deep packet processing calls for a queue selection dependent on information potentially extracted anywhere in the packet including the payload of the data packet.

Therefore. there is a need for a dynamic, flexible, configurable and re-configurable method to handle the selection of receive-queues in network processors.

SUMMARY

According to embodiments of the invention, there is provided a method for operating a network processor. The network processor receiving a first data packet in a stream of data packets and a set of receive-queues adapted to store receive data packets. The network processor processing the first data packet by reading a flow identification in the first data packet: determining a quality of service for the first data packet; mapping the flow identification and the quality of service into an index for selecting a first receive-queue for routing the first data packet; and utilizing the index to route the first data packet to the first receive-queue.

DRAWINGS

The above-mentioned features of the present invention may be better understood, and its numerous objects, features, and advantages made apparent to those skilled in the art by taken in conjunction with the accompanying drawings wherein like reference numerals denote like elements and in which embodiments the invention are described, by way of example only, and with reference to the following drawings.

DETAILED DESCRIPTION

Figure 1:
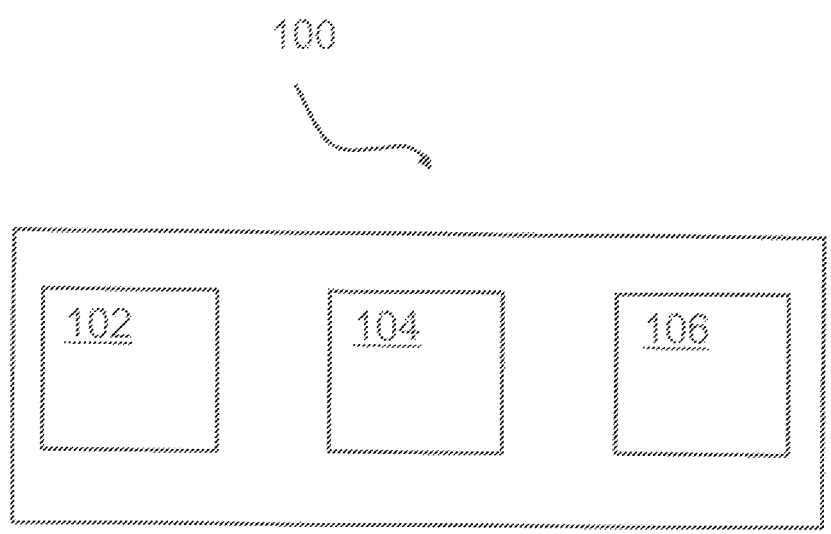
FIG. 1 shows a block diagram of an embodiment of the invention described herein.

Embodiments of the invention arc described below with reference to drawings in detail.

It is noted that the received data packets comply with a network standard. e.g., the protocol (internet protocol) and more particularly IPv4 or IPv6. However, the invention described herein is also applicable to other network protocols based on data packets. The hashing of a flow identification (id) from a data packet is performed by pica-code or by hardware. The network processor may be built as a single integrated chip.

In the context of this application and the embodiments of the invention described herein the following principle terms have been used:

Network processor—The term network processor denotes a special purpose processor required for high-speed and high-throughput networks. It may be in, for example, a router, a switch, an intrusion detection device, a session border controller, a network monitoring system and the like, or also in an end point network device, such as an intranet appliance in a cloud computing environment. The network processor has specific functionality in order to respond and react to incoming as well as outbound network traffic. Network processors may have comparable computing units, e.g., a as a general purpose or controlling processor. On the other hand, network processors may have dedicated units for pattern matching for an identification of specific patterns in data streams. Network processors may also have functions that may be implemented using software elements. In contrast to general purpose processors, the controlling software elements inside the network processors may be pico-code.

Data packet—The term data packet denotes a sequence of e.g., bytes in a data stream. A protocol like TCP/IP (transmission control protocol/internet protocol) may be based on data packets of a certain length having defined positions within the data packet for specific codes.

Receive-queue—The term receive-queue denotes a storage area dedicated for storing incoming data packets or bytes or series of bytes of data, i.e., data words. A receiving device, e.g., a network processor. may have several receive-queues to differentiate data packets with different priorities. High priority data packets may be stored in a high-priority-receive-queue before it may be further processed, e.g., retransmitted, analyzed. etc. A typical mode of operation may be in processing data in a high-priority-receive-queue as long as data is in such a queue. Only if the high-priority-receive-queue is empty, data packets of other, lower priority-receive-queues may be further processed.

Hashing, Hash Function, Hash Code—The term hashing denotes a usage of a hash function. A hash function is any well-defined procedure or mathematical function that converts a large, possibly variable-sized amount of data into a small datum, usually a single integer that serves as an index to an array. The values returned by a hash function are called hash values, hash codes, hash sums, checksums or simply hashes. Hash codes are often used to speed-up table lookup tasks. A hasher denotes a hashing function that may be implemented in hardware or software.

Quality of service—This term denotes a specific code as part of a data packet specifying a need for a high priority for further processing. This may often be the case for streaming video or streaming audio data or IP telephony in order to ensure that there be no break or interruptions in the stream of video or audio data. In an IP packet the term TOS (type of service) may be used instead of QoS. A TOS code may be part of an IP-header section.

Classification criterion function—This term denotes a function used for a classification of data packets supporting the process of selecting a proper receive-queue for a data packet. There may be a plurality of criteria functions beside a quality of service classification function. These additional classification criteria functions may, for example, be based on a hardware accelerator that hashes a flow-id received from a parser, a ternary CAM that performs a look-up of any key assembled by the parser to identify a flow-id, or a direct queue address delivered by the parser. In this case, specific registers may be used that are available to the parser for providing an offset or an index under a microcode/pico-code control.

Combination of classification criteria functions—This term denotes that several criteria functions are available and are—in a combined way—used for selecting a receive-queue. A QoS specification can be handled separately.

TCAM—The term TCAM (ternary content addressable memory) denotes a ternary content addressable memory. A CAM (content addressable memory) is a special type of computer memory used in certain high-speed searching applications. It may also be known as associative memory, associative storage, or associative array. A binary CAM is the simplest type of CAM which uses data search words consisting entirely of 1s and 0s. Ternary CAM (TCAM) allows a third matching state of "X" or "Don't Care" for one or more bits in the stored data word, thus adding flexibility to a search process.

Physical port—The term physical port denotes a physical connection for incoming data. A plurality of ports may be provided. Each physical port may be able to handle a plurality of virtual or logical ports.

Logical port—The term logical port denotes a virtual port belonging to a physical port. Each physical port may be able to handle a plurality of a logical port(s). Each incoming data packet is associated to a partition or logical port. If, e.g., four physical ports are implemented and four logical ports are implemented, a total number of 16 logical ports are handled.

Logical port configuration table—This term denotes a translation mechanism to translate data received from a parser into an index base for a receive queue address, an offset for QoS data specifying how many bit to be used from a QoS signal as well as specifying which and how additional bit from classification criteria function are used.

Typical networks, like e.g., those being based on the TCP/IP protocol, transmit information over networks based on data packets. Streams of data packets are sent from one device or server over linking devices, like e.g., switches and/or routers, to other devices or servers. The devices include any network attached device including servers, PCs, storage area network systems, printers, scanners, dedicated network equipment, or any other network attachable device. The network may be a wired network, a wireless network or a mix of both.

In a typical embodiment of the invention described herein, incoming packets are parsed by a parser, depending on information found during the parsing process, and directed to dedicated receive-queues. The direction into different receive-queues is based on several criteria. E.g., packets with a high priority, e.g., those for a voice-over-IP link, are directed into a high priority receive-queue for a fast, further processing. Packets that are not time critical are directed to a low priority receive-queue, etc.

A selection of a receive-queue is based on a combination of a flow identifier and a quality-of-service parameter found in data packet headers.

Several approaches are described to handle priorities of data packets and a receive-queue selection.

In one embodiment, a method for operating a network processor is provided. The method comprises receiving a stream of data Packets and providing receive-queues, adapted to store received data packets. Furthermore, the method comprises selecting a receive-queue out of the set of receive-queues for a data packet. The selecting is based on a combination of classification functions and a quality-of-service function. One of the classification functions comprises a hashing of a flow identification, wherein the flow identification is in the received data packet.

In particular, the hashing function may be performed by a hasher utilized for other purposes anyway. Thus, an existing hash function may dynamically be repurposed for selecting a receive-queue. Although dedicated to a special task a network processor may also be seen as being similar to a general purpose processor in the sense of executing software instructions.

According to another embodiment a network processor is provided. The network processor comprises a receiving unit adapted for receiving a stream of data packets. Moreover the network processor comprises receive-queues adapted to store received data packets. Additionally, the network processor comprises a selecting unit adapted for selecting a receive-queue out of the receive-queues for a data packet in the set of data packets. The selection is based on a combination of classification functions and a quality-of-service function. One of the classification functions comprises a hashing of a flow identification in the received data packet.

The above-described method for operating a network processor offers some advantages. The separation and combination of different classification criteria functions together with a service criterion function allow for a very flexible and elegant way to select a receive-queue. In particular, a hashing of a flow-id in the data packet beside a quality of service criterion improves the flexibility in receive-queue selection.

These advantages are also achieved by the network processor and the system adapted for a programmable selection of a receive-queue based on multiple attributes found in a packet.

According to one embodiment of the method, the classification functions comprises looking-up a ternary content addressable memory (TCAM) in the received data packet. This direct usage of a TCAM match for a pattern in a data packet increases the flexibility of identifying a receive-queue even more.

In another embodiment of the method, the classification functions uses a queue identifier received from a parser parsing the stream of data packets. This direct usage of a queue identifier found by the parser in a data packet increases the flexibility of identifying or selecting a receive-queue.

In another embodiment of the method, the classification function looking-up a ternary content addressable memory has a higher priority than the classification criteria function hashing of a flow identification. In the case of a TCAM match, the hash value is overwritten.

In another embodiment of the method, the classification function using a queue identifier has a higher priority than the classification function looking-up a ternary content addressable memory. If the queue identifier is directly found in the received data packets, it overwrites any receive-queue identification data found in a TCAM match.

In another embodiment of the method, the selecting utilizes an index base From a logical port configuration table (LPCT), based on a logical port (LP) identification information received from the parser, for building an index address into a queue table for storing an identification number or position of the receive-queue. A configuration allowing a base address as well as one or more offsets to the base address for identifying a correct or optimal receive-queue address has been proven to deliver the highest degree of design freedom of a network processor.

This may also be reflected in an embodiment, wherein the classification functions is used to build an offset to the index base.

In another embodiment of the method, a second offset to the base index is based on the quality-of-service function. Again, such a design of base address of a queue and an offset to a base index has been proven to allow very high flexibility in determining receive-queue addresses.

In another embodiment of the method, it is configurable how many bits of results of each of the classification criteria functions are used to build the index into the queue table. This illustrates the flexibility of the method. It may be configured, for example, in such a way that only the top five bits are used. However, the number of bits used is configurable.

In another embodiment of the method, the results of the classification functions are connected to a multiplexer. This solution allows for choosing the input having a higher priority. If. e.g., there is a TCAM match detected, the TCAM result is used instead of a hash function result.

In another embodiment, the index into the queue table is based on the base index and a combined offset built from the quality-of-service function and the classification functions. This combined offset together with the base index—combined with other features mentioned above—demonstrate again excellent flexibility and configurability for operating a network processor.

In an embodiment, a network device for connecting a plurality of input connections to a plurality of output connections is provided. The network device comprises the network processor as described above. The network device may be, e.g., a router, a switch. an intrusion detection device, a session boarder controller, a network monitoring system and the like or an end point network device, such as an intranet appliance in a cloud computing environment like, e.g., a client or a server computer system.

It should be noted that embodiments may take the form of an entire hardware implementation, an entire software embodiment or an embodiment containing both, hardware and software elements. in an embodiment, the invention may be implemented in software which includes, but is not limited to, firmware, resident software and microcode and/or picocode.

In one embodiment, a data processing program for execution in a data processing system may he provided comprising software code portions for performing the method, as described herein, when the program is run on a data processing system. The data processing system may be a computer or computer system attached to the asset management system via communication means.

Furthermore, embodiments may take the form of a computer program product, accessible from a computer-usable or computer-readable medium providing program code for use, by or in connection with a computer or any instruction execution system, in particular a network processor. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims; whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular between features of the method type claims, system, computer program product, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures are given. All illustrations in the figures are schematic.

FIG. 1 illustrates a method 100 for operating a network processor. The method 100 comprises receiving, 102, a stream of data packets and providing, 104, receive-queues adapted to store received data packets. Furthermore, the method comprises selecting, 106, a receive-queue out oldie receive-queues for one oldie data packets. The selecting is based on a combination of classification functions and a quality-of-service function. One of the classification functions comprises a hashing of a flow identification, wherein the flow identification is in the one received data packet.

Figure 2:
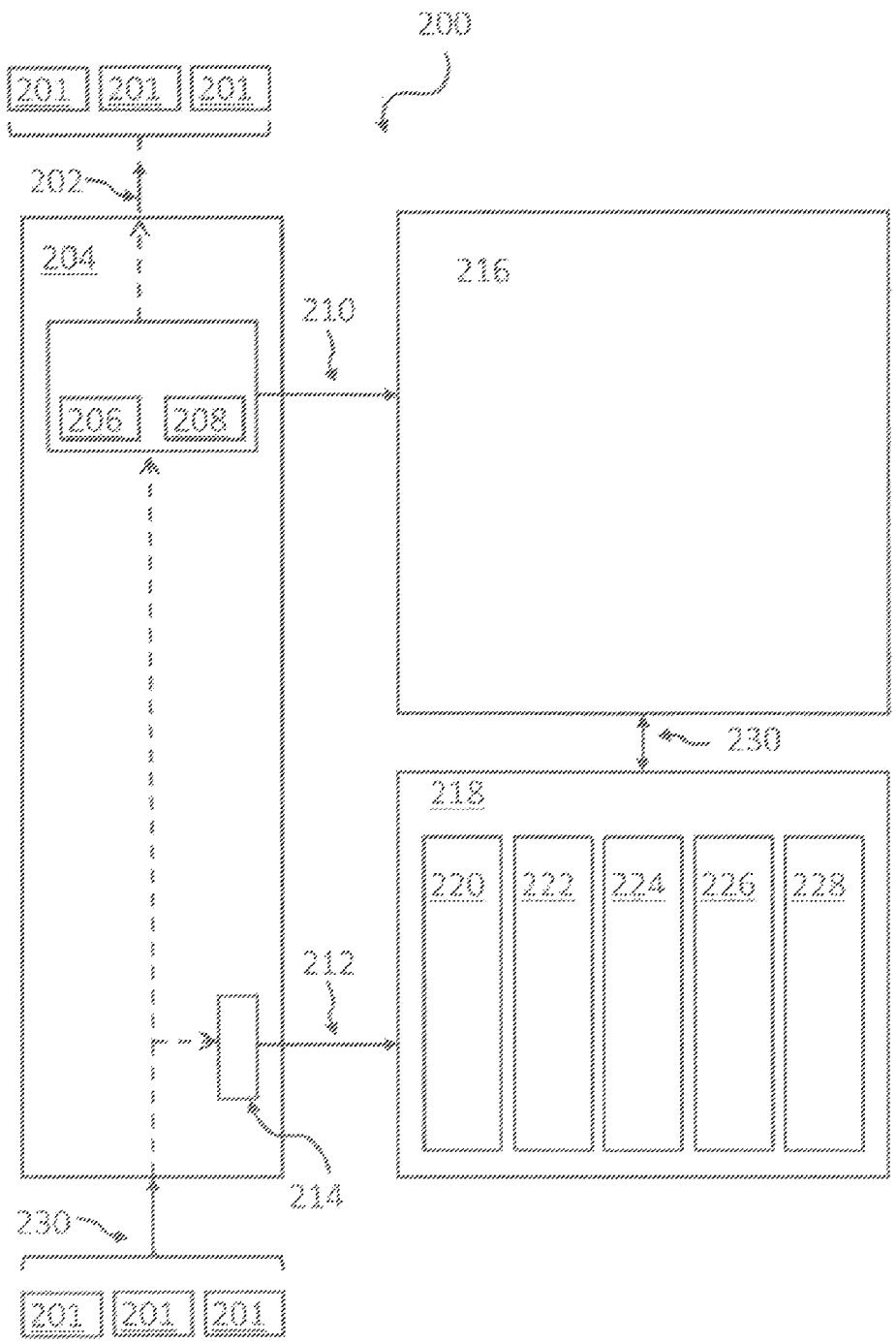
FIG. 2 illustrates a block diagram of an embodiment of the invention in a network processor.

FIG. 2 illustrates an example network processor 200 for which the invention described herein may be implemented. Via link 230 data packets 201 come in from a network (not shown). A plurality of physical ports are provided, in an example embodiment four ports are provided. Each physical port may be adapted to handle a plurality of virtual ports. In one embodiment, four virtual ports per each physical port is configured. The data ports may be adapted to running in 10 Gigabit networks. They may also be functional in one Gigabit and 100 Megabit networks. The incoming data packets 201 are received via line 230 by a receiving unit 204 having at least three components: a register horizontal left (HR) 208, a register horizontal right (HL) 206 and a status register 214. A data packet is received by register horizontal right 208. At the end of a packet processing, the status register 214 receives data. After the data is received by register horizontal right 208 they are passed On to register horizontal left 206. Data packets 201 exit this data path via bus 202 for further processing. All data packets are exposed to the parser 216 via bus 210.

Also the status at an end of a data packet is exposed to the parser via bus 212. In one embodiment, a 128bit wide data path is used. In this case, register 206 and 208 are each 16 byte registers so that the parser 216 is exposed to a 32-byte sliding window of packet data.

The block 218 comprises a series of so-called action machines or in more general words hardware accelerators 220, 222, 224, 226, 228. Block 218 is in a bidirectional data exchange with the parser 216 via link 230. It is noted that far more data traffic may flow from the parser to the accelerators in order to release the parser from specific workloads. All links may he more than one bit wide.

The action machines or hardware accelerators 220, 222, 224, 226, 228 support dedicated functions required in the network processors that may be either repetitive and/or require a high calculation performance. The parser 216 function as well as the functions of the action machines 220, 222, 224, 226, 228 may be based on unit specific pico-code. Although being pico-code, it is loaded into the processor and thus updated if required. Examples of action machines comprise a hashing action machine, a TCAM action machine, quality of service action machine, dedicated lifters, markers, etc. The action machines may be dedicated to release the parser in regard to specific tasks. In one embodiment, the parser is implemented as a finite state machine (FSM). A split between the parser and specific action machine enables parallel processing, and thus the ability to handle high-speed network traffic.

Figure 3:
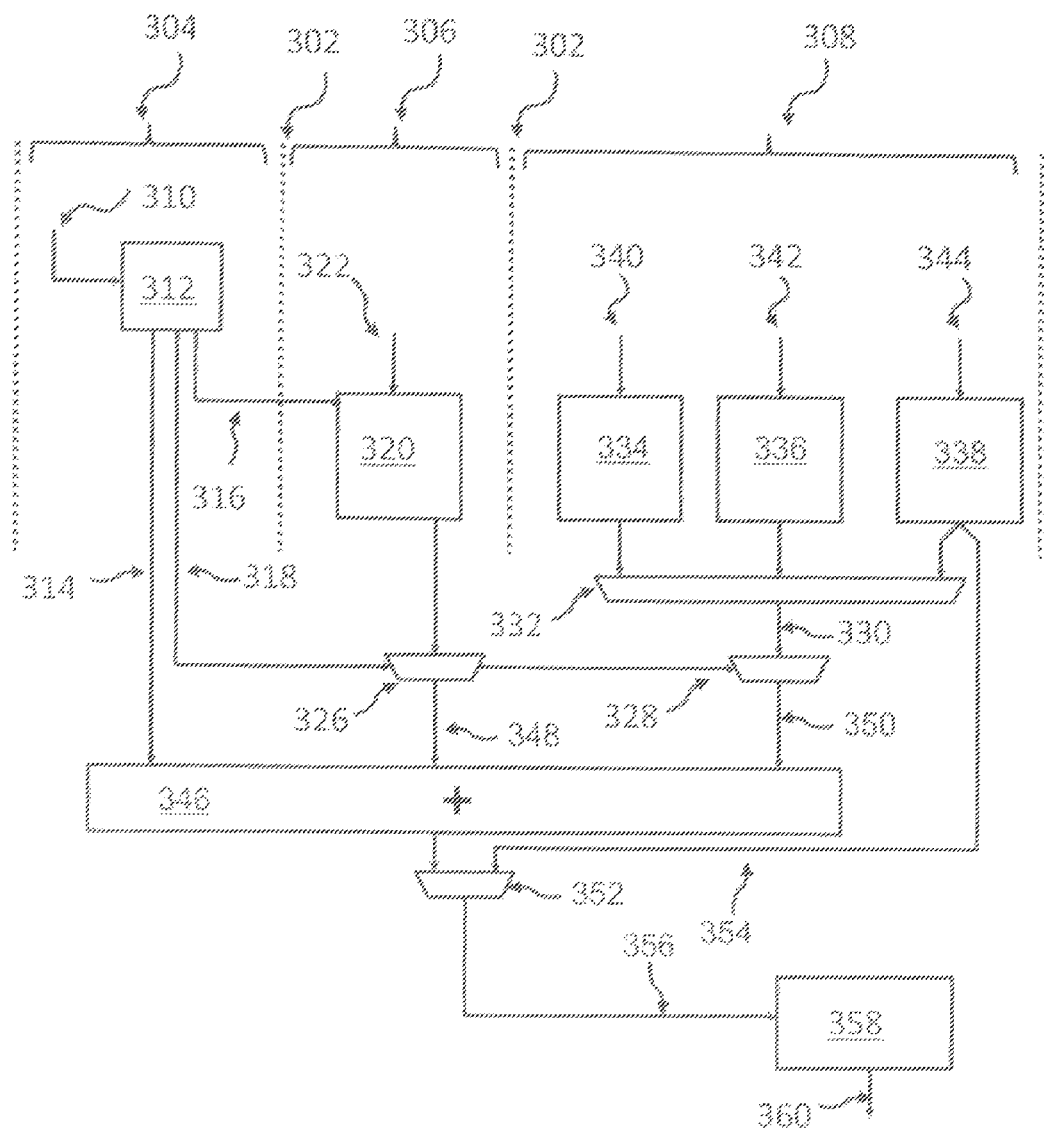
FIG. 3 illustrates a more detailed block diagram of an embodiment in a network processor.

FIG. 3 illustrates an exemplary embodiment as part of the network processor supporting the method of the invention described herein. Three stages separated by dotted lines 302 are shown: a virtualization stage 304, a QoS (quality of service) stage 306 and a classification stage 308. Via line 310 logical IDs are received by a logical port conversion table 312 (LPCT). The LPCT block has three outputs: an index base 314, a QoS select signal 316 and a classification offset select signal 318. The QoS block 320 receives QoS bits from the parser via line 322. An output of the QoS block 320 is directed to a multiplexer 326.

The offset select signal 318 is linked to multiplexer 328, which receives a flow-id offset signal 330 from a multiplexer 332. The multiplexer 332 receives input from several action machines: a hasher 334, a TCAM action machine 336, and a direct queue address function 338.

The hasher 334 receives an n-tuple from the parser via line 340. The TCAM action machine 336 receives packet fields from the parser via line 342. The direct queue address function 338 receives direct queue addresses from the parser via line 344. All lines earning to the different stages in FIG. 2 are illustrated in a combined manner by reference numeral 230 of FIG. 2.

An adder 346 adds the queue address offset coming in via line 314, the offset coming in by line 348 and the offset coming in by line 350 from multiplexer 328.

The final index into the queue table 358 is selected by the multiplexer 352. Either the direct queue table address from the direct queue table address function 338 via line 354 or the index based on the adder 346 is used by line 356. A decision regarding which index is used is based on a control bit (not shown) provided by queue table address function 338. The queue table 358 contains queue numbers issued by line 360 For subsequent usage.

Figure 4:
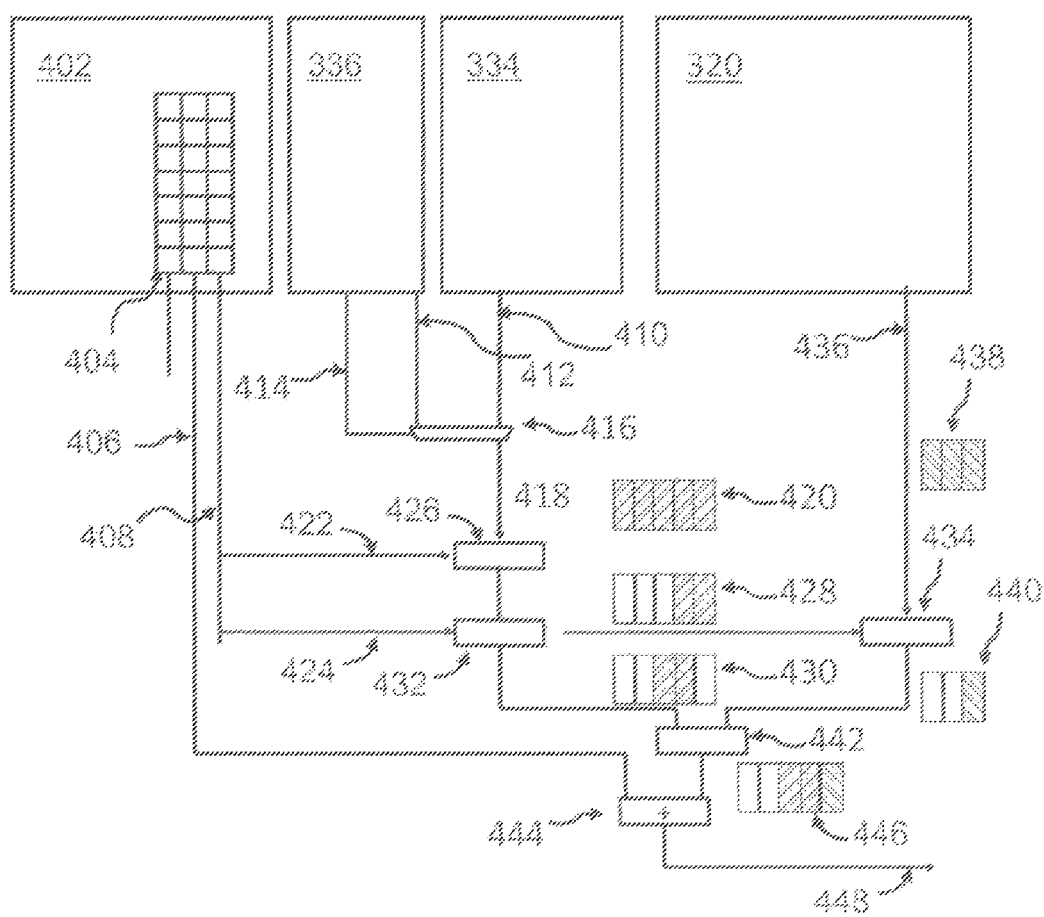
FIG. 4 shows a block diagram illustrating an embodiment of building an index for receive-queues.

FIG. 4 illustrates a more detailed view on an embodiment of the combined entities involved in the receive-queue selection. Blocks 336, 334, 320 represent a TCAM functional block, a hasher, and a QoS functional block as in FIG. 3, respectively.

Attention is paid to the number of bits used from every function or action machine for selecting the receive-queue. Block 402 represents a configuration function comprising a logical port configuration table 404 having seven entries represented by horizontal lines. However, any other number of entries is as good as a table with seven entries.

In an embodiment, each horizontal Field of the logical port configuration table 404 represents five bits. Thus, busses 406 and 408 are each five bits wide. Connection 414 is just one bit wide for a TCAM match signal controlling the multiplexer 416. The multiplexer 416 selects the signal on line 412 from the TCAM block 336 in ease of a TCAM match. Otherwise, the signal on line 410 coming from the hasher 334 is selected. The output of the hasher is typically 32 bit wide, as it may be required for other purposes within the network processor. However, for this example embodiment only the five most significant bits are used for further processing, in particular as input for multiplexer 416. Consequently line 418 also represent a five bit wide signal. This is represented by the live shaded boxes 420 composed of lines from a lower left side to an upper right side.

Parts of line 408, in particular 3 bits represented by line 422, control how many bits are used from signal 418. For this purpose, a masking unit 426 is controlled by line 422 which uses 3 bits out of the 5 bit wide line 408. The remaining two bits from line 408 is represented by link 424. They are used to specify a masking of 0 to 3 bits by masking unit 434 as well as a shift-left of the same number of bits by shift unit 432. This means, that an output of masking unit 426, which of five bits wide, is represented by block 428, showing two active bits with stripes to the right. After a shift unit 432 has shifted the bits, an output of the shifting unit 432 has the relevant bits on position two and three counted from the right side. Signal 424 controls mask unit 434 in which a 3 bit wide output 436 of the QoS function 320 is masked. The striped boxes 438, showing stripes from top left down to bottom right, indicates three priority bits from the QoS function 320. After a masking of the output signal from QoS function 320 the number of active bits is reduced, which is illustrated by the example with one active priority bit as indicated by 440. Both outputs, from shift unit 432—shown as block 430—and from mask unit 434 are 5 bit wide and are input to an or-gate 442. The output of the or-gate 442 is also 5 bit wide. The adder 444 then becomes the base index which comes via line 406 and the offset as a result of the "or-ing" by gate 442 is fed as a total offset 446 to receive-queue selection table. Here, the total offset is added to a base address giving the final entry to the receive-queue selection table via line 448. This table is a 32 by 8 bit register holding pointers to the receive-queues to be selected.

Block 446 illustrates the final combination of bits in the five bit wide input field to adder 114. Line 448—five bit wide—carry the signal for selecting the receive-queue.

Figure 5:
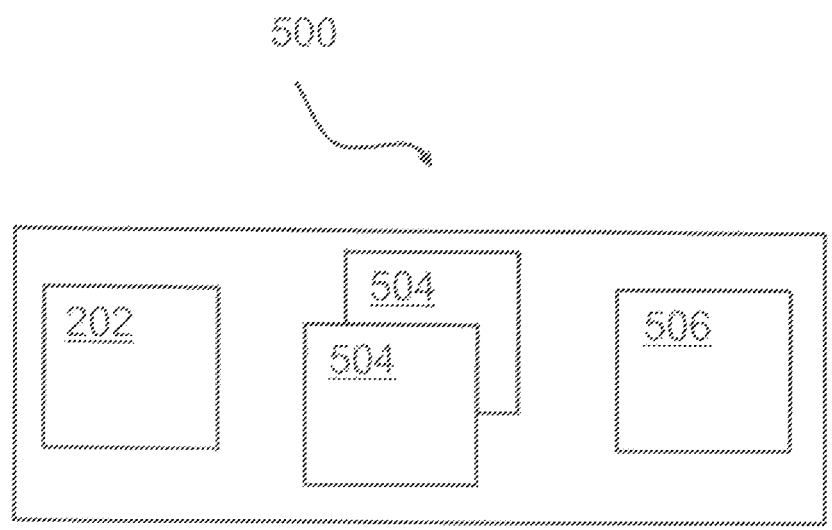
FIG. 5 illustrates a block diagram of an overview on the invention described herein in a network processor.

FIG. 5 shows the network processor 500 comprising a receiving unit 202 adapted for receiving a stream of data packets, receive-queues 504—of which two is shown—adapted to store received data packets, and a selecting unit 506 adapted for selecting a receive-queue out of the receive-queues for one out of the data packets based on a combination of classification functions and a quality-of-service function, wherein one of the classification functions comprises a hashing of a flow identification comprised in the one received data packet.

Figure 6:
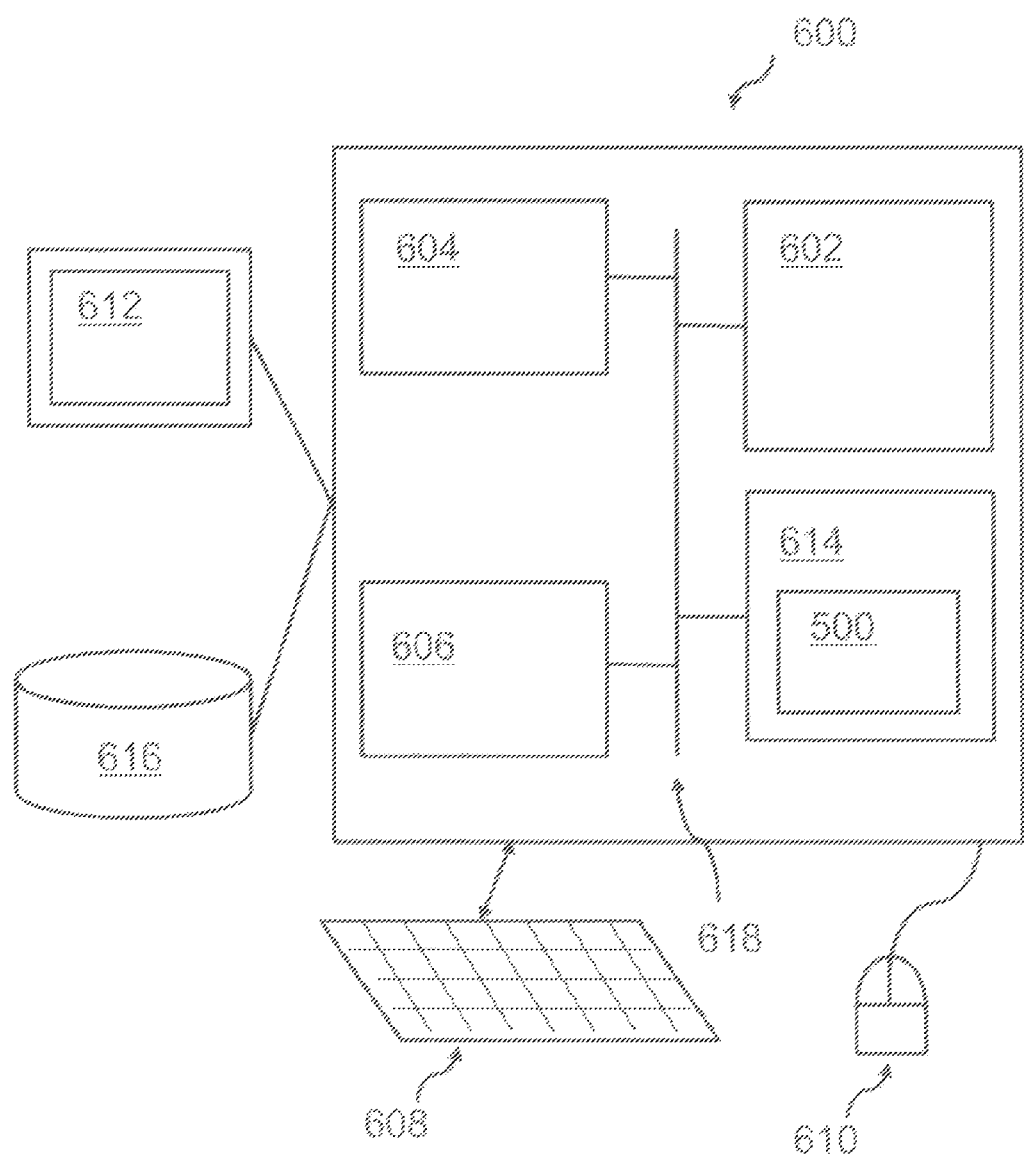
FIG. 6 illustrates a block diagram of an embodiment of the invention described herein as a network processor as part of an end-point device.

Embodiments of the invention may partly be integrated in virtually any type of computer, regardless of the platform being used suitable for storing and/or executing program code, in particular micro- or pico-code. For example, as shown in FIG. 6, a computer system 600 may include one or more processor(s) 602 with one or more cores per processor, associated memory elements 604, an internal storage device 606 (e.g., a hard disk, an optical drive such as a compact disk drive or digital video disk (DVD) drive, a flash memory stick, etc.), and numerous other elements and functionalities typical of today's computers (not shown). The memory elements 604 may include a main memory, employed during actual execution of the program code, and a cache memory, which provides temporary storage for at least some program code or data in order to reduce the number of times, code roust be retrieved from external bulk storage 616 for execution. Elements inside the computer 600 are linked together by means of a bus system 618 with corresponding adapters. Additionally, a network processor 600 may be attached to the bus system 618.

The computer system 600 may also include input means, such as a keyboard 608, a mouse 610, or a microphone (not shown). Furthermore, the computer 600 may include output means, such as a monitor 612 [e.g., a liquid crystal display (LCD), a plasma display, a light emitting diode display (LED), or a cathode ray rube (CRT) monitor]. The computer system 600 is connected to a network (e.g., a local area network (LAN), a wide area network (WAN), such as the Internet, or any other similar type of network, including wireless networks via a network interface connection 614 which may also comprise the network processor 500. This allows a coupling to other computer systems. Those, skilled in the art will appreciate that many different types of computer systems exist, and the aforementioned input and output means may take other forms. Generally speaking, the computer system 600 includes at least the minimal processing, input and/or output means, necessary to practice embodiments of the invention.

Further, those skilled in the art will appreciate that one or more elements of the aforementioned computer system 600 may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources or a smart phone.

Further, software instructions to perform embodiments of the invention are stored on a computer readable medium, such as a compact disk (CD), a diskette, a tape, or any other computer readable storage device and are loaded to the computer system 600 and also partly to the network processor 500 as pico-code.

Figure 7:
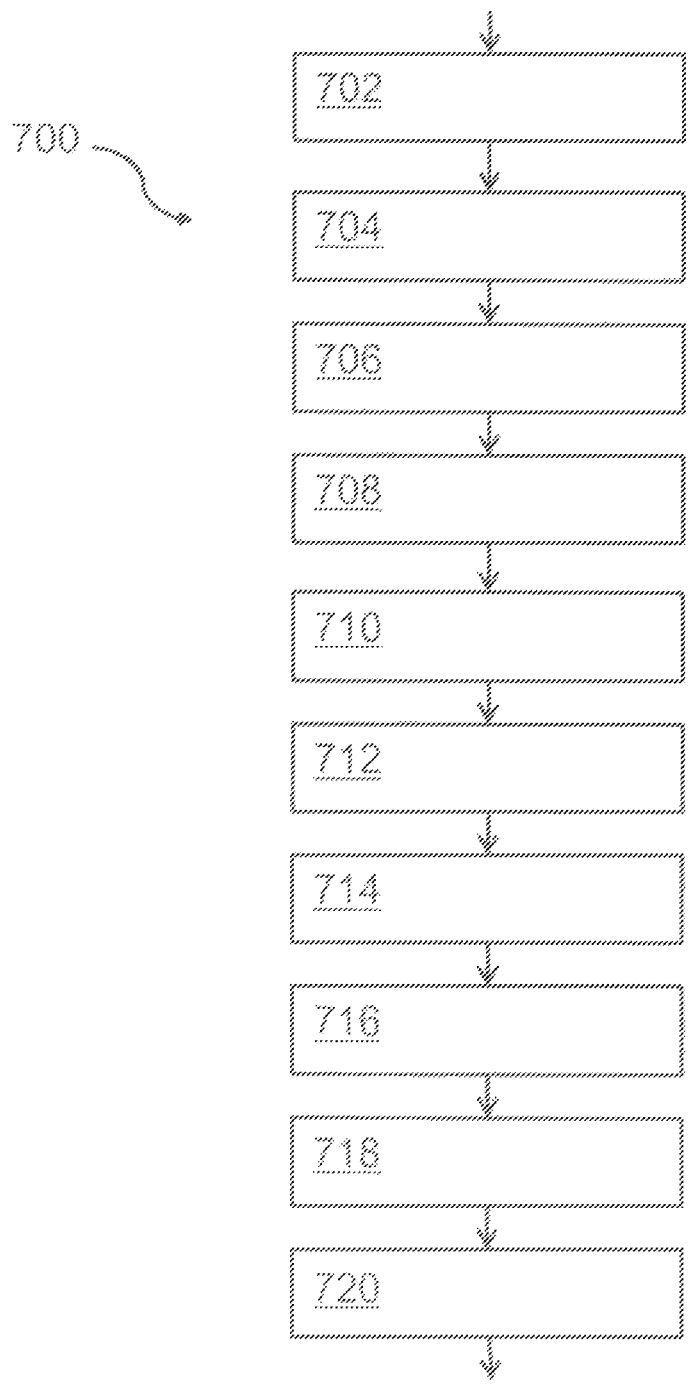
FIG. 7 shows a more detailed. flow chart of an embodiment of the invention described herein.

FIG. 7 shows a flowchart 700 of how a receive-queue address can he built. References are made to FIG. 4 Which shows device elements for performing the method.

In step 702 an index base is built by a configuration function. Step 704 represents selecting either a TCAM 336 output, in case there has been a TCAM match, or the output of the hasher 334. Only the top five bits (5 MSBs) of each output are used in this example embodiment.

In step 706 three bits from the configuration function 402 are used to decide how to mask the result of step 702.

Potentially but not necessarily in parallel, in step 708, a result is built by QoS function 320. The result of this step delivers a three bit result. In step 710 it is decided—based on two bits from the configuration function 402—how many bits of the output of the QoS function 320 are masked. The same two bits are used to perform a shifting function on the masked results of step 702.

In step 712 the results of the steps 706 and 708 are combined by a logical or-function. In step 714 the result of the or-function are added to a base index being delivered by the configuration function. This result is used as an index to a queue table containing receive-queue addresses, step 716. In a further step 718, the entry of the queue table is selected and used as an address for the selected receive-queue. In step 720, the received data packet are stored in the selected receive-queue.

It should be noted that several of the steps described regarding the flow chart 700 could be executed in parallel. Executing in parallel is a preferred embodiment, in particular, for the case for executing, the configuration function, the hasher function, the TCAM function and the QoS function. If may also apply for the shifting and the masking steps if the shifting and masking relate to different data flows, e.g., output of the QoS function and combined output of the TCM and hasher functions, respectively.

While the invention has been described with respect to a limited number of embodiments, those skilled in the art benefitting from this disclosure, will appreciate that other embodiments may be devised, which do not depart from the scope of the invention as disclosed herein. Accordingly, the scope of the invention should be limited only by the attached claims.

It should also be noted that the term "comprising" does not exclude other elements or steps and "a" or "an" does not exclude a plurality. Also, elements described in association with different embodiments may be combined. It should also be noted that reference signs in the claims should not be construed as limiting elements.

We claim:

1. A method for operating a network processor comprising:
receiving a first data packet in a stream of data packets;
processing the first data packet by reading a flow identification in the first data packet;
determining a quality of service for the first data packet;
performing further processing on a set of information including a logical port configuration table to aid in selecting from among a set of receive-queues;
mapping the flow identification and the quality of service into an index for selecting a first receive-queue in the set of receive-queues adapted to store received data packets for routing the first data packet; and
utilizing the index to route the first data packet to the first receive-queue.

2. The method of claim 1 further comprising:
utilizing a hashing function against the flow identification to construct the index.

3. The method of claim 1 further comprising:
utilizing a classification function accessing a ternary content addressable memory for the first data packet.

4. The method of claim 1 further comprising:
utilizing a quality of service function for identifying the quality of service.

5. The method of claim 1 further comprising:
utilizing a parser for decoding the first data packet sending the set of information to the set of one or more processing units for the further processing.

6. The method of claim 5, wherein the set of information further comprises:
including a logical port identification and the logical port configuration table.

7. The method of claim 5, wherein said parser is configured to send the set of information to the set of one or more processing units for further processing.

8. The method of claim 1 further comprising:
selecting the first receive-queue from among the set of receive-queues for the first data packet.

9. The method of claim 8, wherein the selection of the first receive-queue from among the set of receive-queues is based upon a combination of the flow identification and the quality of service mapped into said index matching a receive-queue address of the first receive-queue from among the set of receive-queues.

10. The method of claim 9 further comprising:
directing the first data packet to the first receive-queue from among the set of receive-queues in response to said index matching the receive-queue address of the first receive-queue from among the set of receive-queues.

11. The method of claim 9 further comprising:
selecting a second receive-queue from among the set of receive-queues for a second data packet.

12. The method of claim 11, wherein the selection of the second receive-queue from among the set of receive-queues is based upon a combination of the flow identification and the quality of service mapped into said index matching a receive-queue address of the second receive-queue from among the set of receive-queues.

13. The method of claim 12 further comprising:
directing the second data packet to the second receive-queue from among the set of receive-queues in response to said index matching the receive-queue address of the second receive-queue from among the set of receive-queues.

14. The method of claim 1 further comprising:
directing a second data packet to a second one of the plurality of dedicated receive queues in response to said index matching the receive-queue address of the second one of the plurality of dedicated receive queues.

15. A computer program product for operating a network processor, the computer program product comprising:
computer readable storage device having computer readable program code embodied therewith, the computer readable program code comprising:
computer readable program code configured to receive a first data packet in a stream of data packets;
computer readable program code configured with a set of receive-queues adapted to store received data packets;
computer readable program code configured to process the first data packet by reading a flow identification in the first data packet;
computer readable program code configured to determine a quality of service for the first data packet;
computer readable program code configured to map the flow identification and the quality of service into an index for selecting a first receive-queue for routing the first data packet;
computer readable program code configured to utilize the index to route the first data packet to the first receive-queue; and
computer readable program code configured to send a set of information to a set of other processing units for further processing, the set of information comprising a logical port identification and a logical port configuration table.

16. The computer program product of claim 15, wherein the computer readable program code is configured to utilize a hashing function against the flow identification to construct the index.

17. The computer program product of claim 15, wherein the computer readable program code is configured to utilize a classification function accessing a ternary content addressable memory for the first data packet.

18. The computer program product of claim 15, wherein the computer readable program code is configured to utilize a quality of service function for identifying the quality of service.

19. The computer program product of claim 15, wherein the computer readable program code is configured to utilize a parser for decoding the first data packet; and
the parser sending the set of information to the set of other processing units for further processing.

20. The computer program product of claim 15, further comprising:
computer readable program code for dynamically repurposing an existing hash function for the selecting of the first receive-queue for routing the first data packet.

21. A system for operating a network processor comprising:
a processor;
a receiving unit running on the processor configured for receiving a stream of data packets;
a set of receiving-queues configured for storing received data packets including a first data packet;
a selecting unit configured to process the received data packets by reading a flow identification in the first data packet;
the selecting unit configured to determine a quality of service for the first data packet;
the selecting unit configured to map the flow identification and the quality of service into an index for selecting a first receive-queue for routing the first data packet; and
the selecting unit configured to utilize the index to route the first data packet to the first receive-queue; and
a parser configured to send a set of information to a set of other processing units for further processing, the set of information comprising a logical port identification and a logical port configuration table.

22. The system of claim 21 configured to utilize a hashing function against the flow identification to construct the index.

23. The system of claim 21 configured to utilize a classification function accessing a ternary content addressable memory for the first data packet.

24. The system of claim 21 configured to utilize a quality of service function for identifying the quality of service.

25. The system of claim 21 further comprising having the parser being configured for decoding the first data packet; and
the parser configured for sending the set of information to the set of other processing units for further processing.

26. The system of claim 21 configured to dynamically repurpose an existing hash function for the selecting of the first receive-queue for routing the first data packet.

* * * * *